March 10, 1970    J. D. LAYMAN    3,499,354
TEMPERATURE COMPENSATED CONTROL SYSTEMS
Filed Feb. 29, 1968    3 Sheets-Sheet 1

INVENTOR.
JOHN D. LAYMAN
BY Michael Masnik
HIS ATTORNEY

United States Patent Office 3,499,354
Patented Mar. 10, 1970

3,499,354
TEMPERATURE COMPENSATED CONTROL SYSTEMS
John D. Layman, Waynesboro, Va., assignor to General Electric Company, a corporation of New York
Filed Feb. 29, 1968, Ser. No. 709,407
Int. Cl. B26d 5/30
U.S. Cl. 83—72                                13 Claims

ABSTRACT OF THE DISCLOSURE

In a system for controlling the automatic processing of articles whose dimensions vary as a function of temperature, techniques are disclosed for modifying the control to compensate for such dimensional variations.

BACKGROUND OF THE INVENTION

The invention is directed to automatic control systems which are concerned with the processing or manufacturing of items which are affected by variations in temperature. More particularly, the invention is concerned with the production of products which are affected during processing by dimensional variations as a result of temperature changes.

During the processing and/or machining of metal, wood, glass and other materials, it is known that the materials heat up and tend to expand. If the final product is to exhibit precise dimensions, the amount of expansion must be considered so that the dimensions will be correct when the article is in completed form and at the temperature it will be used. Since materials exhibit individual characteristics, it is necessary to provide means for making compensatory changes during processing which are tailored to the characteristics of the particular material involved. Thus, when temperature variations are involved, one must consider the type and amount of change, and also the effect of various temperature ranges and gradients.

In the following disclosure, an automatic control system for sheet material processing is used to demonstrate illustrative embodiments of the unique temperature compensation arrangement of the present invention. In producing sheet material, a conveyer oftentimes carries large strips of material from a production source through various processing stages wherein it is cut to desired dimensions. The control system senses the speed of material movement and initiates the appropriate cutting and separation functions required to obtain material of desired size and shape. One prior control means is disclosed in U.S. Patent 3,343,436 which issued on Sept. 26, 1967, to William D. Cockrell.

SUMMARY OF THE INVENTION

The present invention is concerned with those systems wherein information is presented in the form of discrete data which can be used for automatically controlling the operation of processing machinery. Such data may be in binary or analog form and there is a multiplicity of systems utilizing such data. For purposes of brevity, the following description is couched in terms of binary-coded control arrangements; however, the broader aspects of the invention are equally well adapted to incorporation in equivalent analog systems.

In general, it will be appreciated that automatic control systems include means for using control data to automatically determine the operation of various machines and machine elements in order to carry out desired processing steps. The control data is compared with corresponding data (e.g., feedback data) which indicates how the machine or element is responding and in this way, error signals are developed which can be used to effect actual controlled operations. The present invention is used in control systems of this general type to selectively modify the control so that the equipment responds by processing articles to dimensions differing from those commanded by the original control data. The amount of difference is that amount required to assure that the article will exhibit the desired dimensions when it resides at the temperature conditions of contemplated use. In order to effect the selective modification of the control data, supplementary data is developed which corresponds to the anticipated change in dimensions that will occur subsequently.

Glass processing is one environment for the description of the invention because glass begins taking form at substantially elevated temperatures and as it cools, it shrinks. Obviously, there are directly analogous metal processing situations. In addition, there are those situations wherein the article being processed becomes heated and thereafter cools. For example, metal may be severely heated and change dimensions during cutting operations and after the cutting is completed it will resume its original temperature accompanied by some shrinkage. Since the dimensional change of materials relative to temperature change can be predicted with accuracy, it is possible to provide the necessary compensation to insure precise dimensioning in each of the described situations.

In glass processing, the hot glass emerges from an annealing oven and since it shrinks as it cools, the cutting equipment that operates upon the glass proximate to the oven will have to cut larger pieces than actually desired in order to insure that when the glass shrinks, it will be of the desired size. As the glass proceeds along the processing line, it gradually cools and the amount of compensation required will diminish.

As well known, glass is rarely actually "cut". It is "scored" by a sharp cutting implement and then broken apart along the scored line. In the following discussion, when reference is made to cutting, it should be appreciated that the actual operation being performed is a scoring of the glass. To produce plate glass of prescribed dimensions, two basic types of cut are made in the sheet that emerges from the annealing oven. "Primary cuts" are those which are made in a direction transverse to the movement of the glass, and "cordwood cuts" are those which are made in a direction parallel to the movement of the glass.

The manner in which control data is varied for primary cuts involves different considerations. To make a primary cut on a moving sheet of glass, the cutter must move across the glass at a prescribed location while it also moves in synchronism with the glass. To make a cordwood cut it is merely necessary to position the cutter at the right location and let the movement of the glass effect the cutting.

An object of the invention is to provide an improved automatic control system for processing products which vary dimensionally in relation to detectable environmental conditions.

Another object of the invention is to provide an improved automatic control system including means for temperature compensating the control data in accordance with characteristics of the article being processed.

Another object of the invention is to provide an improved control system for machines processing articles subject to dimensional changes, wherein elements of said machines are positioned according to a combination of raw command data and supplementary data, said supplementary data compensating for subsequent dimensional changes of the articles.

Another object of the invention is to provide improved automatic machine control systems using binary coded command data, wherein said data is modified in accordance with the temperature characteristics of articles being processed.

Another object of the invention is to modify a command velocity signal for controlling a machine so that said command velocity signal reflects the necessary change in a nominally desired velocity to compensate for expected changes in condition due to variations in temperature.

In accordance with the invention there is provided a system for modyfying control data to compensate for anticipated changes in the characteristics of an article being processed, comprising means for establishing the control data and operative to supply machine control signals in accordance with the information content of the control data, means for sensing the condition of the article and determining the magnitude of the anticipated change, and compensation means for storing supplementary data representative of the magnitude, the compensation means being coupled to the means establishing the control data and modifying the machine control signals supplied thereby by an amount proportional to the magnitude.

A more complete understanding of the invention will become available from the following detailed description made in conjunction with the drawings.

DETAILED DESCRIPTION OF THE PREFERRED EMBODIMENT

Figure 1:
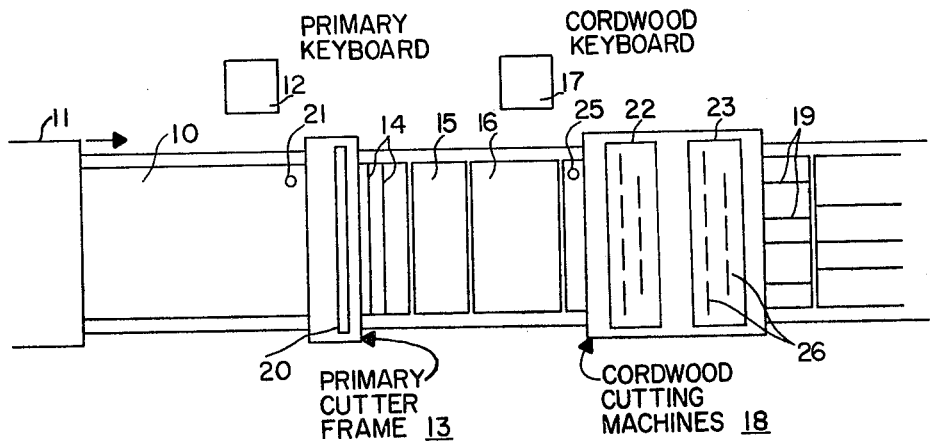
FIGURE 1 is a sketch of a material processing line of a general type wherein the temperature compensation problems solved by the present invention may be encountered.

FIGURE 1 is an illustrative diagram showing the positioning of various cutters along a material processing line. The length of such lines vary; but typically, the portion of the line shown in FIGURE 1 may be several hundred feet in length. On the left of the figure, a strip of material 10, such as glass is shown emerging from an annealing oven 11. As the strip emerges, it is expected that numerous initial operations may be performed before it passes a station at which operators determine where the primary cuts are to be made. The operators insert data concerning the spacing of the primary cuts into primary keyboards 12 and the data in the keyboards is then automatically processed in order to control the functioning of the primary cutter mounted on the primary cutter frame 13. When the glass 10 emerges from the primary cutter frame, it has been scored by the primary cutter at the precise positions indicated by the data placed in the primary keyboards 12. Typical scored lines 14 are illustrated at the output side of the primary cutter frame 13. The conveyor then typically brings the glass sheet 10 over breaker rolls which separate the glass at the scored marks into separate sheets such as 15 and 16. The sheets 15 and 16 are next considered by further operators in order to determine what cordwood cuts are to be made. The cordwood cuts are made by one or more machines 22, 23, etc. which mount a plurality of cutting elements across the conveyer line. The positioning of each of the cutter elements is determined by data inserted into cordwood keyboard 17 by the cordwood operator. Upon emergence from the cordwood cutters the glass has longitudinal scores 19 thereon and can then be broken into pieces of the desired sizes.

In the system contemplated for control by the present invention, the primary cutter frame 13 includes a bridge 20 for making cuts. Further details of the operation and placement of the frame, the bridge, and the individual cordwood machines appears hereinafter when this becomes necessary in describing the various controls.

Since the material cools gradually as it proceeds down the line, and the further shrinkage depends upon its temperature when individual operations are performed, temperature sensing means 21, 25 are positioned at strategic locations in proximity to the machines being controlled. As explained hereafter, various embodiments of the invention are used to introduce compensation data at various stages in the control operation. The manner in which this compensation is introduced varies in accordance with the particular machine functions being controlled.

Figure 2:
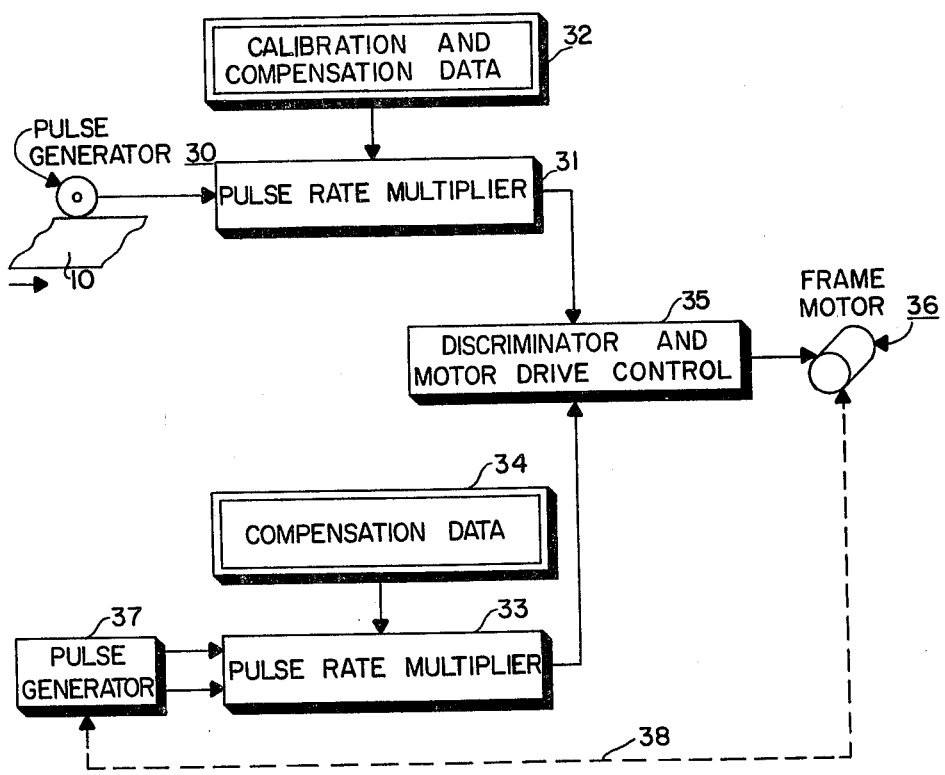
FIGURE 2 is a block schematic of a temperature compensated positioning control operative in conjunction with an illustrative primary cutter frame drive.

FIGURE 2 illustrates how the control over the primary cutter frame 13 is compensated for anticipated material shrinkage. The basic cutting element on this frame is driven across the material while the frame is simultaneously driven in synchronism with the material movement. It is essential that the frame speed be synchronized with the material speed so that the cut is orthogonal to the direction of material movement. Of course, it is also essential that the frame position be controlled relative to the material so that the cutting element will operate at exactly the desired location.

The present invention is not concerned with the particular manner in which the frame is positioned relative to the material; however, it is concerned with enlarging the actual position between primary cuts by a factor which will compensate for subsequent shrinkage. This is accomplished by generating a signal representative of the actual velocity of material movement and then modifying this signal to provide a velocity control signal that indicates the material is moving slightly slower than it actually is. Subsequent control circuitry thereupon acts responsive to the modified data and effects primary cuts with slightly larger spacing than would be the case if the actual material speed were used. The amount by which the velocity signal is modified is, of course, determined by the shrinkage characteristics of the particular material being processed.

The frame 13 is positioned by a motor 36 that is controlled by discriminator and motor drive control circuitry 35. Control circuitry 35 is responsive to command signals which direct the desired spacing between cuts in accordance with the data inserted in primary keyboard 12. The nature and utilization of these signals is not germane to this invention. Control circuitry 35 is also responsive to a velocity control signal representative of the material movement and a feedback signal representative of the frame movement to develop an error signal that effects the synchronization of these movements. Here too, the specific utilization of these signals is not important; however, the manner in which the velocity and feedback signals are modified is important.

Both the material velocity and the frame velocity are presented in the form of pulse trains wherein the repetition rate of the pulses is directly indicative of the velocity. This means, for example, that one pulse may be presented for each one thousands of an inch of travel. As shown in FIGURE 2, the material velocity may be detected by positioning a rotatable pulse generator 30 in frictional contact with the material. The pulses produced by pulse generator 30 are applied to a pulse rate multiplier 31. Pulse rate multipliers are well known circuits which produce a train of output pulses having a prescribed repetition rate relative to the repetition rate of the input pulses applied thereto. The ratio of the input pulses to the output pulses is determined by binary-coded input data. In accordance with the invention, this ratio is established by considering the measured temperature and particular shrinkage characteristics of the material. With this information, and recognizing that the successive occurrence of pulses represents passage of a predetermined length of material, one simply reduces the pulse rate by the shrinkage factor.

The particular means for generating the compensation data may take a number of forms. In one simple form, it may involve the setting of a plurality of thumbwheel switches in accordance with the fractional multiplier desired to temperature compensate the data going through the pulse rate multiplier. In this instance, the setting of the thumbwheel switches is determined after consideration of the temperature differential involved and the shrinkage characteristics of the material. It will be immediately apparent, however, that the compensation data may also be provided automatically in accordance with the output of temperature sensing transducer located in proximity to the material. This output would be used to select from storage the appropriate compensation data for the particular material being processed.

When the data representing material velocity is compensated in order to produce a modified velocity reference, its is also necessary to compensate the feedback information from the frame 13 in order to provide comparable signals for comparison by discriminator and motor drive control 35. This is accomplished in a manner similar to the original compensation. Thus, a servo loop 38 is provided from the frame motor 36 to the discriminator and motor drive control circuit 35. Within this loop, a pulse generator 37 functions to produce a pulse output proportional to the frame movement. This pulse output is then used to drive a pulse rate multiplier 33 which produces the feedback output for comparison with the velocity reference data from pulse rate multiplier 31. Since the frame may be before or behind the desired cutting position, it is necessary that pulse rate multiplier 33 be reversible. The counting rate of the pulse rate multiplier is modified by compensation data 34 of the same amount introduced to temperature compensate the velocity reference data.

A further feature of the invention concerns the utilization of the compensation data input 32 in order to assure accurate calibration of the pulse generator pickup 30. The reason this is required is because pulse generator 30 may vary in its output relative to the material speed. To insure accurate calibration of the pulse generator, it is set to initially produce a higher pulse rate than is desired. For example, rather than producing one pulse for each one thousandth of an inch of material movement, the generator will produce two pulses for each one thousandth of an inch of material movement. This pulse rate can then be controllably modified by simple adjustment of the fractional multiplier setting of pulse rate multiplier 31 to develop the desired output. When element 32 is used for *both* calibration and temperature compensation, it will be apparent that element 34 will still store the data for temperature compensation only. On the other hand, when element 32 is not used for calibration, elements 32 and 34 will store the same data for controlling their respective pulse rate multipliers.

Another object of the invention is to provide an improved signal processing arrangement.

Figure 3:
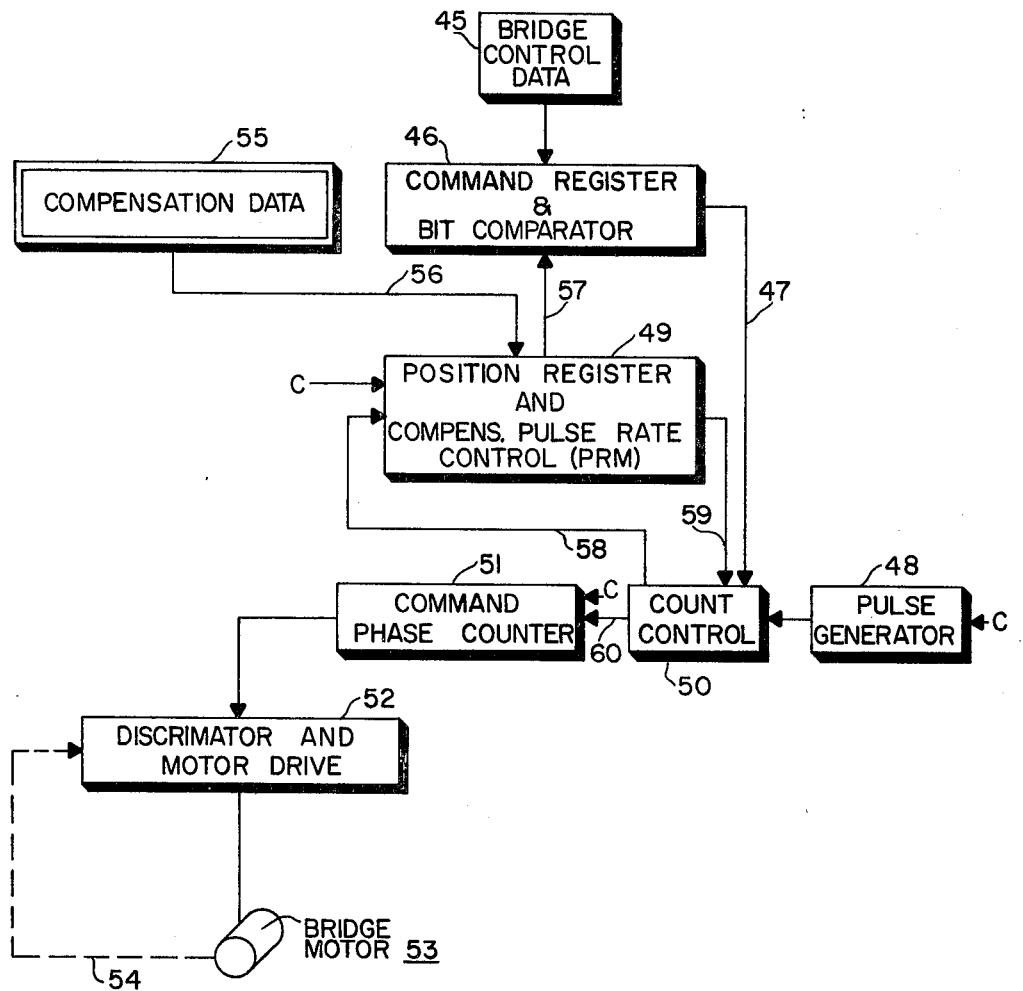
FIGURE 3 is a block schematic of a temperature compensated positioning control operative in conjunction with an illustrative bridge drive associated with a primary cutter frame.

Another aspect of the present invention concerns the control of a bridge 20 on primary cutter frame 13 in a manner which will permit compensation of the setting of the bridge cutter relative to the cutter on the frame. It is conventional to use a bridge on the frame which carries a second cutter. The bridge cutter can be selectively positioned relative to the frame cutter for cutting purposes. The compensation required for the bridge control data differs from that used for the primary cutter frame data compensation because the amount of compensation is a function of both the characteristics of the material and the specific dimensions of the spacing between the bridge cutter and the frame cutter. FIGURE 3 illustrates a block diagram of circuitry for effecting this compensation.

The position of the bridge is controlled by bridge motor 53 in accordance with data stored in the primary keyboard and represented in FIGURE 3 by bridge control data block 45. This data is utilized in a rather conventional fashion by a command register 46 in conjunction with a position register 49 to determine whether or not the bridge is in the position indicated by the command data. If comparison of the data in the command register and that in the position register indicates that movement must be made to relocate the bridge, output 47 discretely identifies the direction of the required movement.

The output 47 determines the counting rate of a command phase counter 51. The output of the command phase counter 51 is a phased displaced signal that discretely represents the position to be attained. In conventional fashion the output of command phase counter 51 is utilized by a discriminator and motor drive circuit 52 in conjunction with an appropriate feedback loop 54 to control the functioning of bridge motor 53 and hence the positioning of the bridge.

Although the particular manner in which the basic positioning control functions is not germane to the present invention, it will be of assistance to note that a pulse generator 48 synchronized with clock pulses C provides a fixed pulse rate for controlling the phase output of command phase counter 51 by controlling the count of clock pulses C. The pulses from pulse generator 48 are applied via count control 50 which establishes whether command phase counter 51 operates at a normal counting rate or at a double or half count rate. The circuitry and control over command phase counters is familiar to those involved in the art of automatic positioning control.

In order to effect the data compensation of the present invention, the position register of prior control systems has been modified to permit the selective modification of the counting rate of the command phase counter. As described in connection with FIGURE 2, the temperature of the material is monitored and used to establish the necessary compensation data. This data is then used to modify the counting of a pulse rate multiplier that produces a controlling output. In the embodiment shown in FIGURE 3, the position register is arranged as a pulse rate multiplier and as such serves a multiple function. Thus, it serves as the means for introducing compensation data to the system, and also fulfills its normal position registration function. FIGURE 3 depicts the position register as a block 49 which is labelled "position register and compensation pulse rate control (PRM)".

The circuitry of position register and compensation pulse rate control 49 consists primarily of binary-coded counter decades plus appropriate gates and connections to provide pulse multiplier operation. Compensation data 55 is applied via output 56 to establish the ratio of input to output pulse rates, and the state of the various stages is compared with the data in the command register to carry out the normal positioning functions. In addition, it is necessary to modify command phase counter 51 to reflect the amount of compensation required. This is accomplished via output 59 and count control 50, which introduce the necessary no count or double count controls to the command phase counter. Output 58 from the count control 50 provides signals which determines how many clock pulses the position register 49 counts up or down. The effect of the compensation control is to cause command phase counter 51 to provide slightly more increments of phase change than the corresponding counts of the position register 49. This results in lengthening the commanded movement by the amount necessary to compensate for the subsequent glass shrinkage.

Once again, it will be clear that the compensation data may be inserted manually following measurement of the temperature of the material in the proximity of the primary cutter frame. Alternatively, this temperature may be automatically monitored and utilized to select the appropriate data from a storage unit wherein data for material of particular characteristics may be stored in accordance with any well known procedure.

Thus far, temperature compensation schemes for use in conjunction with the primary cutter frame and bridge have been considered. It is also necessary to compensate for temperature variations in connection with the cuts made by the cordwood cutting machines 18. A number of unique problems are presented when one is concerned with the temperature compensation of cordwood cutting machines. It is common practice to utilize one or more cutting machines 22, 23, etc., so that one of them may be out of operation while any others are being used.

It is important to recognize the manner in which the cordwood cutting elements are disposed. For example, several cutting elements 26 may be located within each machine. They can be positioned in two rows across the face of the conveyer system. As illustrated in FIGURE 1, the first row of cutters contains some of the elements and the second row contains the remaining elements. Each cutting element is adapted to move a given range of inches with the ranges of adjacent elements overlapping. Thus, cordwood cuts can be made at any preselected position. The position of the cutting elements may be determined with respect to one side of the material which is considered as the zero reference.

Figure 4:
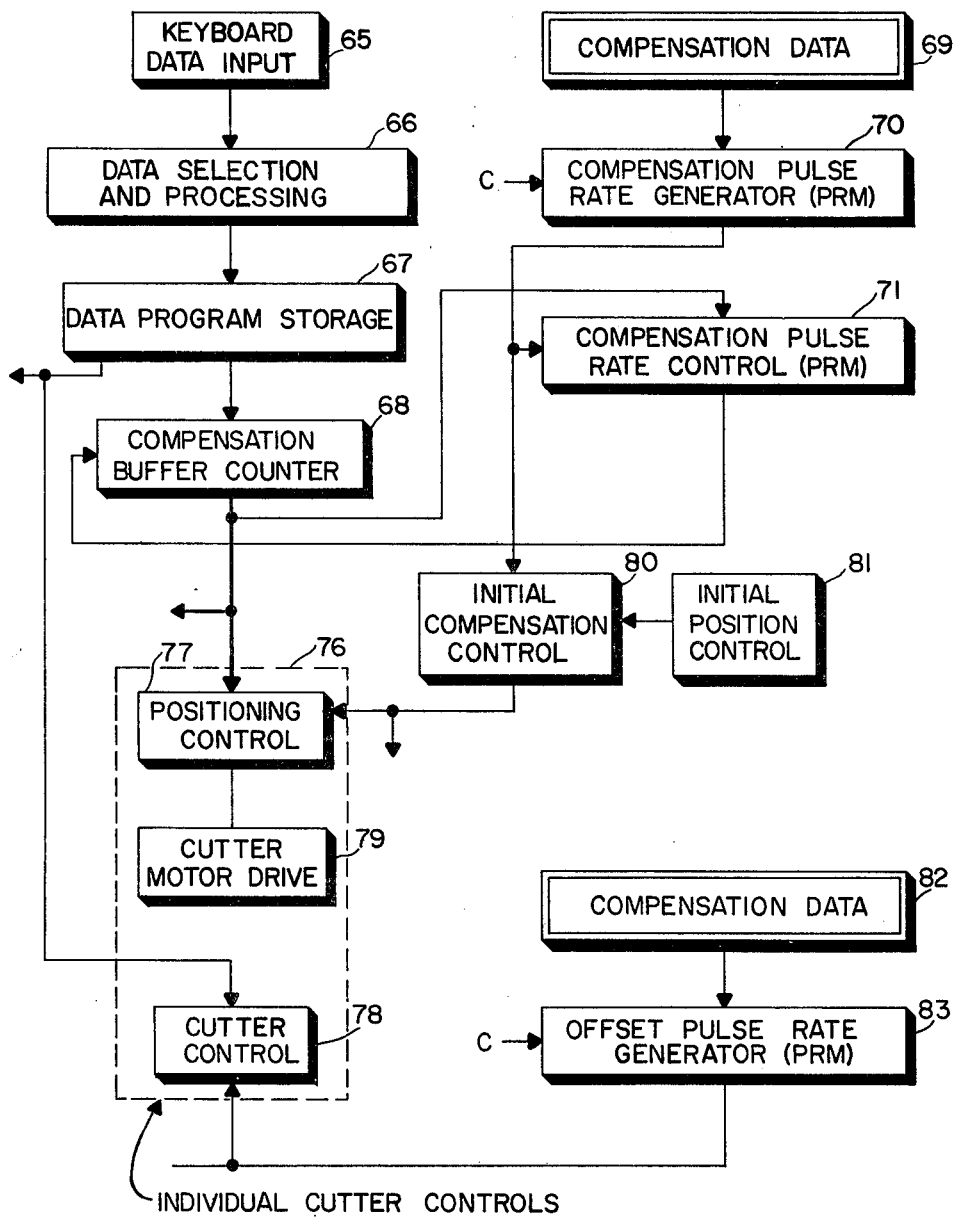
FIGURE 4 is a block schematic of a temperature compensated positioning control operative in conjunction with the cutters for developing cordwood cuts.

The positioning of each cutter element is established by a cutter motor drive 79 and a cutter control 78 as shown in FIG. 4. The function of the motor drive is to locate the cutter in the proper position to effect the desired cut and the function of the cutter control is to lower the cutter at precisely the right moment. The cutter motor drive is controlled by positioning control circuitry 77 similar to that previously considered and known in the art. The positioning control 77 is in turn responsive to the information contained in binary form in a buffer counter unit 68. Each of the mentioned controls is duplicated for each cutter element. Accordingly, the elements within the dashed outline indicated by numeral 76 appear once, but should be considered to exist for each cutter element.

The data for controlling the position of the cordwood cutters is inserted in the cordwood keyboard 17 by an operator as the material approaches the cordwood cutting machines 18. This data indicates where the cordwood cuts are to be made with reference to the zero point. It also indicates which cutter elements are to make the cuts. It is transmitted from the cordwood keyboard (depicted as keyboard data input 65 in FIGURE 4) into data selection and processing unit 66 which converts it to the appropriate form for use in a binary control system. From data selection and processing unit 66, the data is placed in program storage 67 wherein it is stored until needed. The output of data program storage 67 leads directly into compensation buffer counter 68 and is arranged so that the data corresponding to the control over a particular cutter is read into the buffer counter. Note that whereas the data program storage 67 stores complete programs of data for an entire cordwood cutting machine, the compensation buffer counter 68 operates upon the data for an individual cutter at any one time. At an appropriate time determined by a timing sequence and control circuit that is not a feature of the present invention, the information from the compensation buffer counter 68 along with selected information for the relevant cutter from the data program storage 67 is gated to the individual cutter controls for positioning of the cutter elements.

The compensation buffer counter 68 is in fact a counter containing a plurality of binary coded decimal decades. The state of these decades is directly indicative of the position that the cutter element must assume to correspond with the associated keyboard input data, as modified by the compensation circuitry of the present invention.

In this embodiment of the invention, two pulse rate multipliers are used to effect the necessary compensation modification of the data in compensation buffer counter 68. The first of these pulse rate multipliers has been designated compensation pulse rate generator 70. This pulse rate generator produces an output signal having a rate indicative of the amount of compensation required. For example, the rate would represent the amount by which the command must be compensated for each 100 inches of command data. The pulse train output of compensation pulse rate generator 70 is applied to a second pulse rate multiplier 71 designated "compensation pulse rate control." The output of compensation pulse rate control 71 is then used to count up the compensation buffer counter 68 by an appropriate amount to compensate the data stored therein for expected shrinkage. Since the amount of modification required is a direct function of the dimensions of the glass to be cut, it is necessary to modify the pulse rate of compensation pulse rate control 71 in accordance with the number actually stored in compensation buffer counter 68. Thus, the quantity registered in the compensation buffer counter is used to develop the fractional multiplier for the compensation pulse rate control.

As explained above, the data supplied by keyboard data input 65 relates to operations to be performed by one or more cordwood cutting machines, each machine having one or more rows of cutting elements which are offset downstream of one another. Thus, when compensation is employed, it is also necessary to compensate the dimensions required by the cordwood machines in accordance with which machine and which row of cutting elements is being employed. This is also necessary because the previous use of compensation has resulted in a fictitious velocity rate for the glass that is being processed. The cordwood cutting machines must accordingly be operated with this fictitious rate in mind. A further pulse rate multiplier on the lower right of FIGURE 4, designated the offset pulse rate generator 83, effects these controls by appropriately modifying the normal cutter control signals in accordance with compensation data supplied in the manner heretofore explained. As shown in the figures, pulse rate multipliers, such as those designated by blocks 70 and 83, also require a fixed rate or "clock" pulse input C.

Finally, under normal operating procedures it is customary to initially position the individual cutting elements of a cordwood cutting machine so that subsequent operations will proceed from known references. In view of the fact that shrinkage must be anticipated and the shrinkage will vary depending upon the dimension of the material cut, the initial positioning of the cutting elements must take this compensation into effect. In other words, the cutting elements near the reference edge of the cordwood cutter must be modified only slightly to account for shrinkage. Those disposed further away from the reference edge must be compensated to a greater amount because a greater amount of shrinkage will occur. The required controls are effected by an initial position control 81 and an initial compensation control 80. The initial compensation control 80 is in fact a gating arrangement which is used to selectively apply the output of the compensation pulse rate generator 70 to the position control circuitry 77. The amount of compensation inserted in any case is determined by the particular location of each cutter element being controlled.

A number of embodiments of the invention have been shown and described. As explained initially, although the embodiments have been presented within the environment of a particular processing control system, it will be apparent that the compensation problems solved by this invention are rather universal in the automatic control art. It is contemplated in the appended claims to cover all variations and modifications of the invention which come within the spirit, scope, and teachings of the disclosure.

What is claimed as new and desired to be secured by Letters Patent of the United States is:

1. A system for modifying machine control data to compensate for anticipated changes in the dimensional characteristics of an article being processed as a result of a change in a condition of said article, comprising means for establishing said control data and operative to supply machine control signals in accordance with the information content of said control data, means for sensing said condition and determining the magnitude of said anticipated change and compensation means for storing supplementary data representative of said magnitude, said compensation means being coupled to the means establishing said control data and modifying the machine control signals supplied thereby by an amount proportional to said magnitude.

2. A system according to claim 1, wherein the means for establishing said control data includes a pulse rate multiplier which normally produces an output pulse rate proportional to the velocity of said article and said compensation means supplies an input to said pulse rate multiplier which modifies said pulse rate by an amount proportional to the magnitude of said anticipated change.

3. A system according to claim 2, including a unit to be driven at a rate synchronized with the velocity of said article, means for generating feedback pulses proportional to the velocity of said unit, a second pulse rate multiplier operative in response to said feedback pulses, further compensation means storing said supplementary data and supplying an input to said second pulse rate multiplier which modifies the output thereof by an amount proportional to the magnitude of said anticipated change, and means for comparing the outputs of said pulse rate multipliers to develop an error signal for controlling the drive for said unit.

4. A system according to claim 3, wherein each pulse from said first pulse rate multiplier represents a predetermined distance of travel of said article, said system including sensing means coupled to said article and producing pulses at a rate wherein each pulse represents a distance of travel less than that represented by the pulses from said first pulse rate multiplier, the first mentioned compensation means also storing data representative of the desired ratio between the pulse rates of said sensing means and said first pulse rate multiplier.

5. A system according to claim 1 including a unit driven at a rate synchronized with the velocity of said article, said unit having two elements that contact said article and are adjustably displaceable relative to one another, with the position of one of said elements being regarded as the reference position, means for storing control data representing a nominal value for the displacement, means for comparing said control data with corresponding data representing the actual displacement, position control means controlled by the difference between said data to reposition the other of said elements to reduce said difference to zero, and further compensation means for modifying said position control means to effect an actual displacement between said elements that compensates for the anticipated change in the characteristics of the article being processed.

6. A system according to claim 5 wherein said position control means includes a pulse generator and a command phase counter operative to develop a phase displacement control signal for positioning said other element, and said further compensation means includes a pulse rate multiplier providing a controllable pulse rate for controlling the operation of said command phase counter, said pulse rate being adjustable in accordance with the ratio between said nominal value and the value required to compensate for said anticipated change in characteristics.

7. A system according to claim 1 wherein said control data is stored in binary form, said means for establishing said control data includes a counter that is preset to an amount representative of a nominal position to be assumed by an element that will contact said article, and said compensation means includes: a pulse source supplying pulses at a rate proportional to the compensation required, and a pulse rate multiplier driven by said pulse source, the fractional multiplication rate of said pulse rate multiplier being established by the amount registered in said counter, and the output of said pulse rate multiplier being operative to modify the amount registered in said counter to effect said compensation.

8. A system according to claim 7 wherein said pulse source is a pulse rate multiplier supplied by pulses at a fixed rate and controlled to fractionally multiply this fixed rate in accordance with the amount of compensation required.

9. A system according to claim 8 including a plurality of cutting elements disposed along a line of travel of the article being processed, a cutter control operative in response to command data to position said cutting elements in contact with said article, a third pulse rate multiplier supplied by pulses at a fixed rate and controlled to fractionally multiply this fixed rate in accordance with the amount of compensation required to modify the command data for said cutter control.

10. A system according to claim 7 including a plurality of cutting elements disposed transverse the direction of travel of said article, means for positioning said cutting elements in accordance with command data, means operative in accordance with the magnitude of the anticipated change in said article for selectively modifying the command data for individual cutting elements as a function of their distance from a predetermined location.

11. In a system for cutting sheet material which exhibits a predetermined variation in dimensions as a function of temperature, means for transporting said material in a given direction, means for sensing the temperature of said material, pulse generator means contacting said material and producing a plurality of pulses at a rate proportional to the velocity and said material, a unit adapted to move a cutting element transverse the direction of movement of said material at a commanded time, drive means for driving said unit in said given direction at a rate determined by the repetition rate of an input signal, a pulse rate multiplier coupling the output of said pulse generator to the input of said drive means, and a compensation data generator operative in accordance with the sensed temperature of said material and said known predetermined variation in dimensions to establish the fractional multiplication rate for said pulse rate multiplier that will compensate for said variation.

12. In a system for cutting sheet material which exhibits a predetermined variation in dimensions as a function of temperature, means for transporting said sheet material in a given direction, means for sensing the temperature of said material, a unit driven at a rate synchronized with the velocity of said material, said unit having two cutting elements adapted for movement transverse the said given direction and adjustably displaceable relative to one another, means for storing control data representing a nominal value for the displacement between said elements, means for comparing said control data with corresponding data representing the actual displacement, position control means controlled by the difference between said data to reposition one of said elements until said difference is zero, and compensation means responsive to the sensed temperature and operative in accordance with the particular characteristics of the sheet material, for modifying the position control means to effect an actual displacement between said elements that compensates for the anticipated change in dimensions.

13. In a system for cutting sheet material which exhibits a predetermined variation in dimensions as a function of temperature, means for transporting said material in a given direction, means for sensing the temperature of said material, a cutting element adapted to be lowered onto said sheet material while held in a relatively stationary position, means for determining when said cutting element is to be lowered, means for determining the position of said cutting element relative to one side of said sheet material, said positioning means being responsive to predetermined control data and including a counter preset to an amount representative of a nominal position, a pulse source supplying pulses at a rate determined by the sensed temperature and characteristics of the sheet material, and a pulse rate multiplier driven by said pulse source, the fractional multiplied rate of said pulse rate multiplier being established by the command registered in said counter and the output of said pulse rate multiplier being operative to modify the command registered in said counter.

References Cited

UNITED STATES PATENTS 3,163,065  12/1964  Kolodgy et al. _____ 83—72

WILLIAM S. LAWSON, Primary Examiner

U.S. Cl. X.R.

83—11, 287, 364